United States Patent [19]

Namba et al.

[11] Patent Number: 4,650,815

[45] Date of Patent: Mar. 17, 1987

[54] FOAMED ARTICLES OF FLUOROCARBON RESINS

[75] Inventors: Mutsusuke Namba, Settsu; Osamu Shirasaki, Osaka; Tomohiko Hirata, Settsu, all of Japan

[73] Assignee: Daikin Industries, Ltd, Osaka, Japan

[21] Appl. No.: 786,389

[22] Filed: Oct. 10, 1985

[30] Foreign Application Priority Data

Oct. 11, 1984 [JP] Japan .............................. 59-213664
Jan. 9, 1985 [JP] Japan .................................. 60-1866
Jan. 23, 1985 [JP] Japan ................................ 60-11491

[51] Int. Cl.$^4$ ............................................. C08J 9/00
[52] U.S. Cl. .................................... 521/77; 264/127; 521/88; 521/134; 521/145; 521/919
[58] Field of Search ................. 521/77, 88, 919, 145, 521/134; 264/127

[56] References Cited

U.S. PATENT DOCUMENTS 2,985,918 5/1961 Moore et al. ...................... 264/127
3,054,761 9/1962 Moore et al. ......................... 521/77
4,451,616 5/1984 Kawachi et al. .................... 264/127

*Primary Examiner*—Morton Foelak
*Attorney, Agent, or Firm*—Armstrong, Nikaido, Marmelstein & Kubovcik

[57] ABSTRACT

A process for producing an expanded or foamed body of a fluorocarbon resin comprising molding the resin in a molten state in the presence of a depolymerizable polymer, polyether or polycarbonyloxy compound.

17 Claims, No Drawings

FOAMED ARTICLES OF FLUOROCARBON RESINS

This invention relates to foamed articles of fluorocarbon resins.

In recent years, foamed or expanded articles of fluorocarbon resins are used as insulations for communication cables, etc., taking advantage of their low dielectric constant, lightweightness and heat resistance. However, since fluorocarbon resins generally have a higher melting point than common synthetic resins, preparation of foamed articles from these resins invariably requires a higher molding temperature than common synthetic resins. Although extensive research has been conducted, blowing agents and foaming methods suited to fluorocarbon resins still remain to be developed. U.S. Pat. No. 3,072,583 discloses a process for producing such foamed articles. With this known process, fluoromethane gas is caused to penetrate into the resin to be extruded for a given period of time under a predetermined pressure, and the resin is then fed to an extruder to foam or expand the resin with the gas incorporated therein upon extrusion from the die. Nevertheless, this process encounter difficulty in giving a foamed article having uniform fine closed cells with a high degree of expansion because fluoromethane gas fails to penetrate into the resin sufficiently and further because the degree of penetration varies with lapse of time. Other known processes are disclosed in Unexamined Japanese Patent Publications Nos. SHO 52-53964, SHO 53-121864 and SHO 54-41969. These processes employ thermally decomposable organic or inorganic solid blowing agents to produce foamed articles, but the inorganic and organic blowing agents used have problems. The inorganic blowing agents, which start decomposition at relatively low temperatures, have difficulty in adjusting the rate of expansion and give molded products which are rough-surfaced or have a coarse cellular structure. The organic blowing agents rapidly decompose at high temperatures, making it difficult to afford foamed articles having uniform cells, while some kinds of blowing agents color the expanded product with the decomposition product.

An object of the present invention is to provide a process for producing a foamed or expanded article of fluorocarbon resin having a high degree of expansion and fine uniform closed cells.

Another object of the present invention is to provide a process for producing a foamed article of fluorocarbon resin in which the rate of expansion of resin is easily adjustable, overcoming the problem of rough surface and coarse cellular structure of the product.

Another object of the invention is to provide a process for producing a foamed article of fluorocarbon resin free of coloration due to the blowing agent.

Other objects and features of the present invention will become apparent from the following description.

The present invention provides a process for producing a foamed article of a fluorocarbon resin characterized in that the fluorocarbon resin is heated and molded in a molten state in the presence of:

(i) a depolymerizable polymer having a structural unit represented by the formula

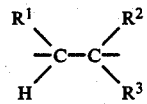

wherein $R^1$ is hydrogen or $-COOR^4$ group (wherein $R^4$ is hydrogen, a lower hydrocarbon group or fluorinated lower hydrocarbon group), $R^2$ is hydrogen, fluorine, a lower hydrocarbon group, fluorinated lower hydrocarbon group or $-COOR^4$ group (wherein $R^4$ is as defined above), and $R^3$ is $(CH_2)_k COOR^4$ group (wherein $R^4$ is as defined above, and k is 0 or 1) or

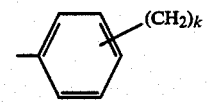

group (wherein k is as defined above), or (ii) a polyether compound represented by the formula $$R^5(X^1O)_m R^6 \qquad (2)$$

wherein $R^5$ is hydrogen, halogen, hydroxyl group, a lower alkyl group or halogenated lower alkyl group, $X^1$ is a lower alkylene group or halogenated lower alkylene group, $R^6$ is hydrogen, a lower alkyl group, halogenated lower alkyl group, lower alkyloxy group or halogenated lower alkyloxy group, and m is an integer of from 2 to 30,000, or (iii) a polycarbonyloxy compound having 2 to 20 carbon atoms.

In the specification and appended claims, the groups modified with the term "lower", such as lower hydrocarbon group or lower alkyl group, are those having 1 to 6 carbon atoms.

Our research has revealed that when fluorocarbon resins are foamed in a molten state with heating in the presence of the compound (i), (ii) or (iii), the foregoing problems of the prior art can be substantially eliminated or greatly alleviated. The present invention has been accomplished based on this novel finding.

The fluorocarbon resins useful for the present invention are high polymeric compounds containing at least 50 wt.% of fluorine and having a number average molecular weight of about 20,000 to about 1,000,000 and a melt index (g/10 min) of about 0.5 to about 50 as measured according to ASTM D 1238-70.

Preferred examples of such fluorocarbon resins are:

(a) homopolymers of a monomer selected from the group consisting of tetrafluoroethylene, chlorotrifluoroethylene and 2,2-difluoroethylene, (b) copolymers of at least two of the above monomers (a), and (c) copolymers of at least one of the above monomers (a) with a monomer selected from the group consisting of hexafluoropropene, perfluoroalkyl vinyl ether, oxy-containing perfluoroalkyl vinyl ether and ethylene.

These fluorocarbon resins can be prepared by polymerizing the desired monomer or monomers by usual processes, such as emulsion, suspension, solution, block bulk and vapor-phase polymerization processes. A chain transfer agent such as methanol may be used in these processes.

When the fluorocarbon resin is a copolymer, the ratio of the monomers to be polymerized is not limited specifically.

The copolymer may be composed of at least three of the foregoing monomers, while the copolymer may contain other copolymerized ethylenically unsaturated compound insofar as the desired properties of the copolymer are not impaired.

Although not limitative, examples of oxy-containing perfluoroalkyl vinyl ethers are $CF_3CF_2CF_2OCF=CF_2$,

$CF_3CF_2CF_2OCFCF_2OCF=CF_2$, etc. (with $CF_3$ branch)

The depolymerizable polymer having a structural unit (1) is a homo- or co-polymer usually having a number average molecular weight of about 10,000 to about 5,000,000. It is a polymer of ethylenically unsaturated monomer(s) which is depolymerizable and vaporizable at a temperature of about 150° C. lower than the melting point of the fluorocarbon resin to the decomposition temperature thereof. The closer the depolymerization temperature to the melting point of the fluorocarbon resin, the better is the polymer. Preferred depolymerizable polymers are those wherein the hydrocarbon group is an aliphatic group, the substituent $R^1$ is H, $R^2$ is F or $CH_3$, and $R^3$ is —COORf wherein Rf is H or a fluorinated lower aliphatic group.

More specific examples of preferred depolymerizable polymers are those having one of the following structural units.

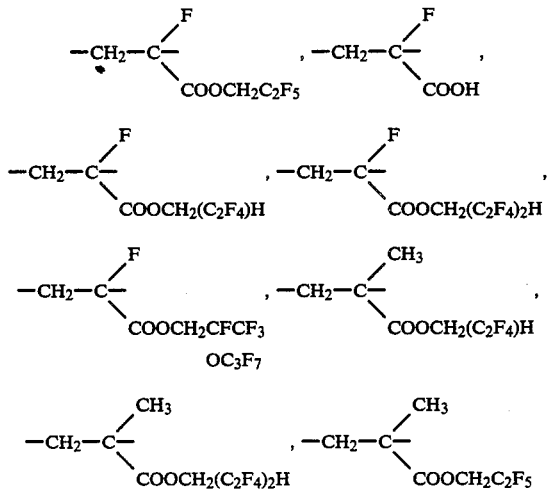

The depolymerizable polymer having a structural unit of the formula (1) can be obtained by polymerizing a monomer represented by the formula

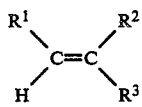

wherein $R^1$, $R^2$ and $R^3$ are as defined above, by the similar processes as used for preparing the fluorocarbon resin.

To obtain uniformly foamed articles, the depolymerizable polymer is used usually in an amount of about 0.01 to about 50 parts by weight, preferably about 0.05 to about 10 parts by weight, per 100 parts by weight of fluorocarbon resin.

When the depolymerizable polymer is used for practicing the invention, the composition of fluorocarbon resin and depolymerizable polymer usually has admixed therewith a heat-resistible nucleating agent in the form of fine particles of up to 50 μm in size, and serving as nuclei when the polymer is depolymerized. The expansion nucleating agent has the function of producing fine uniform cells. Examples of useful nucleating agents are talc, sericite, kieselguhr, boron nitride, silicon nitride, fine silica, alumina, zirconia, quartz powder, aluminum hydroxide, kaolin, bentonite, zinc sulfide, molybdenum disulfide, carbon black, graphite, titanium oxide and the like, although these examples are not limitative. The expansion nucleating agent is used usually in an amount of about 0.01 to about 10 parts by weight, preferably about 0.5 to about 5 parts by weight, per 100 parts by weight of the fluorocarbon resin.

The composition of fluorocarbon resin and depolymerizable polymer may further incorporate therein a metal compound which serves as a catalyst when the polymer is depolymerized. Examples of useful metal compounds are oxides or hydroxides of copper, cobalt, iron, nickel, chromium, vanadium, tantalum, cerium, thorium, manganese, bismuth, cadmium, gallium, iridium, rhodium, platinum, palladium, tin, tungsten, lithium, sodium, potassium, lead, ytterbium, molybdenum and silver, and compounds which are converted to oxides or hydroxides of such metals when heated to about 100° to about 500° C. More preferred metal compounds are oxides or hydroxides of chromium, cobalt, iron, nickel, cerium, thorium, manganese, bismuth, cadmium, lithium, sodium, potassium, lead and molybdenum.

Usually about 0.005 to about 5 parts by weight of the metal compound is used per 100 parts by weight of the fluorocarbon resin.

Other additives which can be admixed with the composition include fillers or reinforcing agents such as glass fiber, glass power, and asbestos fiber, stabilizers, lubricants, pigments and the like.

The polyether compounds to be used as blowing agents for the present invention and represented by the formula (2), i.e., $R^5(X^1O)_mR^6$ wherein $R^5$, $R^6$ and $X^1$ are as defined above, are usually those having a number average molecular weight of 300 to 1,000,000 preferably 1,000 to 50,000, and containing at least two ether groups. More preferable examples of the compounds of the formula (2) are those represented by the formula

$R^7(CY^1{}_2CY^2{}_2CY^3{}_2O)_nCY^4{}_2R^8$ wherein $Y^1$ to $Y^4$ are the same or different and are each hydrogen, halogen, a lower alkyl group or halogenated lower alkyl group, $R^7$ and $R^8$ are the same or different and are each hydrogen, halogen, hydroxyl group, a lower alkyl group, halogenated lower alkyl group, lower alkyl-oxy group, halogenated lower alkyl-oxy group, —$OX^1R^9$ group (wherein $X^1$ is as defined above, $R^9$ is a lower alkyl-oxy group or halogenated lower alkyl-oxy group), —$CY^1{}_2COOH$ group (wherein $Y^1$ is as defined above) or —$CY^1{}_2COZ$ group (wherein $Y^1$ is as defined above, and Z is a halogen), and n is 1 to 10,000.

Examples of useful polyether compounds are:
$F(CH_2CF_2CF_2O)_nCH_2CF_3$ wherein n is 1 to 10,000.

F(CH₂CF₂CF₂O)ₙCH₂CF₂COF wherein n is 1 to 10,000.

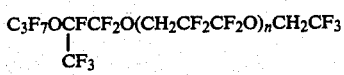

wherein n is 1 to 10,000.
C₃F₇O(CH₂CF₂CF₂O)ₙCH₂CF₃ wherein n is 1 to 10,000.
F(CCl₂CF₂CF₂O)ₙCCl₂CF₃ wherein n is 1 to 10,000.

In order to obtain uniformly foamed articles, the polyether compound is used usually in an amount of about 0.01 to about 50 parts by weight, preferably about 0.05 to about 10 parts by weight, per 100 parts by weight of the fluorocarbon resin.

When the polyether compound of the formula (2) is used as the blowing agent for fluorocarbon resins, a nucleating agent, metal compound and additives can also be admixed with the composition when required. As such nucleating agent, metal compound catalyst and additives, the same materials as used in combination with the depolymerizable polymer are usable in like proportions.

The polycarbonyl-oxy compounds useful as blowing agents for the present invention are aliphatic, alicyclic and aromatic carboxylic acids having at least two carbonyl-oxy groups in the molecule, and salts of such acids. These compounds have the function of foaming fluorocarbon resin on thermal decomposition when heated along with the resin. Examples of carboxylic acids having two carbonyl-oxy groups in the molecule are oxalic acid, itaconic acid, citraconic acid, acetonedicarboxylic acid, maleic acid, succinic acid, glutaric acid, phthalic acid, adipic acid and the like. Examples of carboxylic acids having three carbonyl-oxy groups in the molecule are citric acid, a conitic acid and the like. However, these examples are not limitative. Examples of salts of carboxylic acids having at least two carbonyl-oxy groups in the molecule are ammonium, sodium, potassium, magnesium, calcium and copper salts of above carboxylic acids. These examples are not limitative, either.

To obtain uniformly foamed articles, the polycarbonyl-oxy compound is used usually in an amount of about 0.01 to about 50 parts by weight, preferably about 0.05 to about parts by weight, per 100 parts by weight of fluorocarbon resin.

When the polycarbonyloxy compound is used as the blowing agent for fluorocarbon resins, a nucleating agent, metal compound and additives can be admixed with the composition when required, as in the foregoing cases. The same materials as already mentioned are usuable in similar proportions in this case.

According to the present invention, the composition containing as essential components a fluorocarbon resin and a blowing agent such as depolymerizable polymer is heated and molded in a molten state by extrusion expansion molding, injection expansion molding or die expansion molding.

When extrusion expansion molding is resorted to, the composition is made into fine particles or pellets, which are then continuously extruded by a screw extruder while being heated, to cover an electric wire or cable with the foamed resin or to give a foamed article in the form of a rod, pipe, plate, sheet, film, filament, strand or in other form. The foamed article is usable as a covering for electric wires or cables as above, heat insulator, sound-proof material, lightweight structural material, etc. To gradually depolymerize or decompose the depolymerizable polymer or like blowing agent and finally completely depolymerize or decompose the blowing agent when foamed articles are to be produced by extrusion expansion molding, the cylinder of the extruder is so heated that it has a progressively increasing temperature from the composition inlet toward the die portion, where the highest temperature is maintained. The extruder to be used usually has a cylinder diameter D of 20 to 50 mm and an L/D ratio of 15 to 25 wherein L is the length of the screw. However, these dimensions are not limitative.

The expansion ratio (%) of the foamed article is expressed by:

$$(A-B)/A \times 100$$

wherein A is the specific gravity of the fluorocarbon resin, and B is the specific gravity of the foamed article.

The expansion ratio of the product obtained by the extrusion expansion process is usually about 50 to about 75%. When the foamed article is used as a 3-mm-thick covering for electric wires, the dielectric constant of the resin is usually about 1.3 to about 1.6.

When injection expansion molding is resorted to, the composition is made into fine particles or pellents as in the case of the extrusion expansion process, and the material is fed to a screw in-line while being heated for injection expansion molding (injection pressure: about 300 to about 800 kg/cm²). The foamed article obtained is usually about 0.65 to about 0.9 in specific gravity and about 60 to about 90% in expansion ratio.

In the case of die expansion molding, the components are usually pulverized into fine particles, about 20 to about 80 μm in size, and mixed together. The mixture is placed into a die, pressurized to about 20 to about 200 kg/cm² for the removal of air and then allowed to stand for about 1 to about 2 hours for foaming while being heated to the melting point of the fluorocarbon resin. The foamed article obtained is usually about 0.65 to about 0.9 in specific gravity and about 60 to about 90% in expansion ratio.

The present invention will be described below with reference to the following examples and comparative examples.

EXAMPLES 1–8

One part by weight of boron nitride (1 to 8 μm in particle size, product of Denki Kagaku Kogyo Co., Ltd., Japan) was added to 100 parts by weight of the fluorocarbon resin listed in Table 1, and the ingredients were uniformly mixed together by a V-type blender. The powdery mixture obtained was continuously extruded into a rod, 2 to 3 mm in diameter, by an extruder (cylinder diameter D: 25 mm, screw length L: 500 mm, L/D=20). At the same time, the rod was made into pellets, 3 to 4 mm in length, by a pelletizer.

With the pellets was admixed the depolymerizable polymer (up to 500 μm in particle size) listed in Table 1. Subsequently, the mixture was extruded into an expanded rod, 5 mm in diameter, by an extruder having the dimensions listed in Table 2 under the conditions given in the same table. Table 1 shows the expansion ratio, expanded state and degree of coloration of the rod.

TABLE 1

| Example | Fluorocarbon resin | Depolymerizable polymer Kind | Amount (1) | Expansion ratio (2) (%) | Foamed state | Coloration of foamed resin |
|---|---|---|---|---|---|---|
| 1 | Copolymer of tetrafluoroethylene/hexafluoropropylene (82/18, by wt.), M.I. = 6 g/10 min | Methyl methacrylate polymer, no. av. molecular weight = 30,000 | 0.1 | 40 | Uniform | None |
| 2 | Copolymer of tetrafluoroethylene/hexafluoropropylene (82/18, by wt.), M.I. = 6 g/10 min | Methyl methacrylate polymer, no. av. molecular weight = 30,000 | 1.0 | 60 | Uniform | None |
| 3 | Copolymer of tetrafluoroethylene/hexafluoropropylene (82/18, by wt.), M.I. = 6 g/10 min | Methyl methacrylate polymer, no. av. molecular weight = 30,000 | 5.0 | 70 | Slightly uneven | None |
| 4 | Copolymer of tetrafluoroethylene/hexafluoropropylene (82/18, by wt.), M.I. = 6 g/10 min | Copolymer of methyl methacrylate/ethyl acrylate/methacrylic acid (39/57/4, by wt.) no. av. molecular weight = 30,000 | 0.1 | 50 | Uniform | None |
| 5 | Copolymer of tetrafluoroethylene/hexafluoropropylene (82/18, by wt.), M.I. = 6 g/10 min | Copolymer of methyl methacrylate/ethyl acrylate/methacrylic acid (39/57/4, by wt.) no. av. molecular weight = 30,000 | 1.0 | 60 | Uniform | None |
| 6 | Copolymer of tetrafluoroethylene/hexafluoropropylene (82/18, by wt.), M.I. = 6 g/10 min | Copolymer of methyl methacrylate/ethyl acrylate/methacrylic acid (39/57/4, by wt.) no. av. molecular weight = 30,000 | 5.0 | 70 | Slightly uneven | None |
| 7 | Copolymer of tetrafluoroethylene/perflurobutyl vinyl ether (98/2, by wt.), M.I. = 10 g/10 min | Methyl methacrylate polymer, no. av. molecular weight = 30,000 | 1.0 | 60 | Uniform | None |
| 8 | Copolymer of tetrafluoroethylene/ethylene (50/50, by wt.), M.I. = 15 g/10 min | Methyl methacrylate polymer, no. av. molecular weight = 30,000 | 1.0 | 60 | Uniform | None |

Note
(1) In parts by weight per 100 parts by weight of fluorocarbon resin.
(2) As defined above.

TABLE 2

| | Extruder | | | Extrusion temperature (°C.) | | | | |
|---|---|---|---|---|---|---|---|---|
| | | | | Cylinder | | | | |
| Example | Cylinder diam. (mm) | L/D | Rotation of screw (rpm) | Rear portion | Mid portion | Front portion | Die head | Tip |
| 1–7 | 30 | 22 | 15–30 | 360 | 380 | 380 | 340 | 320 |
| 8 | 30 | 22 | 15–30 | 300 | 320 | 300 | 340 | 350 |

L stands for the length of screw, and D for the diameter of cylinder.

EXAMPLES 9–13

One part by weight of the same boron nitride as used in Example 1 was admixed with 100 parts by weight of the fluorocarbon resin listed in Table 3, and the mixture was made into pellets by the same procedure as in Examples 1 to 8.

The depolymerizable polymer listed in Table 3 was added to the pellets, and the mixture was pulverized by an impact mill. The powdery mixture obtained was extruded by the extruder shown in Table 2 onto a tin-plated soft copper wire, 0.7 mm in outside diameter, to obtain an electric wire covered with a foamed resin with a thickness of 3 mm. Table 3 shows the expansion ratio, foamed state, degree of coloration and dielectric constant of the foamed resin.

TABLE 3

| Example | Fluorocarbon resin | Depolymerizable polymer Kind | Amount | Expansion ratio (%) | Foamed state | Coloration of foamed resin | Dielectric constant of foamed resin |
|---|---|---|---|---|---|---|---|
| 9 | Same as in Example 1 | α-Methylstyrene polymer, no. av. | 1 | 60 | Uniform | None | 1.4 |

TABLE 3-continued

| Example | Fluorocarbon resin | Depolymerizable polymer Kind | Amount | Expansion ratio (%) | Foamed state | Coloration of foamed resin | Dielectric constant of foamed resin |
|---|---|---|---|---|---|---|---|
| 10 | Same as in Example 1 | α-Methylstyrene polymer, no. av. molecular weight = 50,000 | 5 | 70 | Uniform | None | 1.3 |
| 11 | Same as in Example 1 | α-Methylstyrene polymer, no. av. molecular weight = 50,000 | 10 | 70 | Slightly uneven | None | 1.3 |
| 12 | Same as in Example 7 | α-Methylstyrene polymer, no. av. molecular weight = 50,000 | 1 | 60 | Uniform | None | 1.4 |
| 13 | Same as in Example 7 | α-Methylstyrene polymer, no. av. molecular weight = 50,000 | 5 | 70 | Uniform | None | 1.3 |

Note:
The amount of depolymerizable polymer and the expansion ratio in Table 3 and Tables shown below are as defined above.

EXAMPLES 14–18

The depolymerizable polymer (copolymer) listed in Table 4 and up to 500 μm in particle size was admixed with the same pelletized fluorocarbon resin as used in Example 1. A covered electric wire was prepared in the same manner as in Examples 9 to 13 using the resulting composition. Table 4 shows the expansion ratio, foamed state, degree of coloration and dielectric constant of the foamed resin.

TABLE 4

| Example | Depolymerizable polymer Kind | Amount | Expansion ratio (%) | Foamed state | Coloration of foamed resin | Dielectric constant of foamed resin |
|---|---|---|---|---|---|---|
| 14 | αF5F/AFM (1/1 by wt.) | 1 | 60 | Uniform | None | 1.4 |
| 15 | αF5F/AFM (1/1 by wt.) | 5 | 70 | Uniform | None | 1.35 |
| 16 | 4FM/MMA (9/1 by wt.) | 1 | 60 | Uniform | None | 1.4 |
| 17 | 4FM/MMA (9/1 by wt.) | 5 | 70 | Uniform | None | 1.3 |
| 18 | 5FM/MMA (4/1 by wt.) | 1 | 60 | Uniform | None | 1.4 |

αF5F, αFM, 5FM, 4FM and MMA given in Table 4 represent the following monomers respectively.

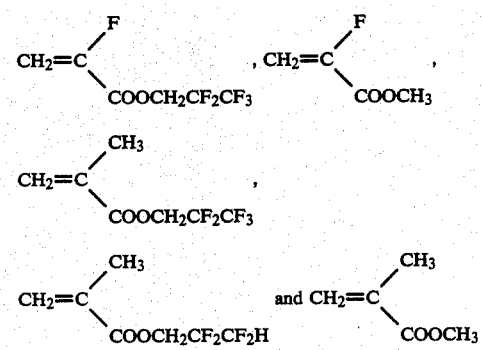

COMPARATIVE EXAMPLE 1

With the same mixture as used in Example 1 of 100 parts by weight of fluorocarbon resin and 1 part by weight of boron nitride was admixed the known organic blowing agent given in Table 5, and the mixture was pulverized by a hammer mill.

The resulting mixture was extruded in the same manner as in Examples 1 to 8, giving a foamed rod having a diameter of 5 mm. Table 5 shows the expansion ratio, foamed state and coloration degree of the rod.

TABLE 5

| Example | Fluorocarbon resin | Conventional organic blowing agent Kind | Amount | Expansion ratio (%) | Foamed state | Coloration of foamed resin |
|---|---|---|---|---|---|---|
| Comp. 1 | Same as in Example 1 | Dinitrosopenta- methylenetetramine | 1 | 40 | Uneven | Colored brown |

EXAMPLE 19

A uniform mixture was prepared from 100 parts by weight of the same pelletized fluorocarbon resin composition as used in Example 1 and 0.5 part by weight of the same methyl methacrylate polymer as used in Example 1.

The mixture was fed to a screw in-line injection molding machine having a cylinder diameter of 42 mm and a nozzle orifice diameter of 3.5 mm at an injection pressure of 300 to 800 kg/cm$^2$ while rotating the screw at 70 to 180 rpm/min. The cylinder was heated to temperatures of 350° C., 370° C. and 380° C. at its rear portion, midportion and front portion, respectively, and the nozzle temperature was 380° C. The foamed resin obtained was 0.65 to 0.9 in specific gravity and 60 to 70% in expansion ratio.

EXAMPLE 20

A uniform mixture was prepared from 100 parts by weight of the same fluorocarbon resin power (20 to 80 μm in particle size and 0.2 to 0.7 g/cc in apparent density) as used in Example 1 and 0.5 part by weight of the same methyl methacrylate polymer as used in Example 1.

A 200 g quantity of the mixture was placed into a mold, 100 mm×100 mm×70 mm (height), which was then closed and thereafter pressurized to 20 to 200 kg/cm$^2$ for deaeration. Subsequently, the mixture was maintained at 280° to 380° C. for 2 hours, with the lid of the mold left open, giving a foamed resin which was 0.65 to 0.9 in specific gravity and 60 to 70% in expansion ratio.

EXAMPLES 21-27

One part by weight of boron nitride (1 to 8 μm in particle size, product of Denki Kagaku Kogyo Co., Ltd., Japan) was added to 100 parts by weight of the fluorocarbon resin listed in Table 6, and the ingredients were uniformly mixed together by a V-type blender. The powdery mixture obtained was continuously extruded into a rod, 2 to 3 mm in diameter, by an extruder (cylinder diameter D: 25 mm, screw length L: 500 mm, L/D=20). At the same time, the rod was made into pellets, 3 to 4 mm in length, by a pelletizer.

With the pellets was admixed the polyether compound listed in Table 6. Subsequently, the mixture was extruded into a foamed rod, 5 mm in diameter, by an extruder having the dimensions listed in Table 7 under the conditions given in the same table. Table 6 shows the expansion ratio, foamed state and degree of coloration of the rod.

TABLE 6

| Example | Fluorocarbon resin | Polyether compound Structural formula | Amount (1) | Expansion ratio (2) (%) | Foamed state | Coloration of foamed resin |
|---|---|---|---|---|---|---|
| 21 | Copolymer of tetrafluoroethylene/ hexafluoropropylene (82/18, by wt.), M.I. = 6 g/10 min | $F(CH_2CF_2CF_2O)_nCH_2CF_2COOH$<br>n = 5-100 | 0.5 | 50 | Uniform | None |
| 22 | Copolymer of tetrafluoroethylene/ hexafluoropropylene (82/18, by wt.), M.I. = 6 g/10 min | $F(CH_2CF_2CF_2O)_nCH_2CF_2COOH$<br>n = 5-100 | 1.0 | 60 | Uniform | None |
| 23 | Copolymer of tetrafluoroethylene/ hexafluoropropylene (82/18, by wt.), M.I. = 6 g/10 min | $F(CH_2CF_2CF_2O)_nCH_2CF_2COOH$<br>n = 5-100 | 5.0 | 60 | Uniform | None |
| 24 | Copolymer of tetrafluoroethylene/ hexafluoropropylene (82/18, by wt.), M.I. = 6 g/10 min | $C_3F_7OC(F)(CF_3)CF_2O(CH_2CF_2CF_2O)_nCH_2CF_3$<br>n = 3-15 | 0.5 | 50 | Uniform | None |
| 25 | Copolymer of tetrafluoroethylene/ hexafluoropropylene (82/18, by wt.), M.I. = 6 g/10 min | $C_3F_7OC(F)(CF_3)CF_2O(CH_2CF_2CF_2O)_nCH_2CF_3$<br>n = 3-15 | 1.0 | 60 | Uniform | None |
| 26 | Copolymer of tetrafluoroethylene/ perfluorobutyl vinyl ether (98/2, by wt.), M.I. = 10 g/10 min | $F(CH_2CF_2CF_2O)_nCH_2CF_2COOH$<br>n = 10-150 | 1.0 | 60 | Uniform | None |
| 27 | Copolymer of tetrafluoroethylene/ ethylene (50/50, by wt.), M.I. = 15 g/10 min | $F(CH_2CF_2CF_2O)_nCH_2CF_2COOH$<br>n = 10-150 | 1.0 | 60 | Uniform | None |

Note
(1) In parts by weight per 100 parts by weight of fluorocarbon resin.
(2) As defined above.

TABLE 7

| | Extruder | | | Extrusion temperature (°C.) | | | | |
|---|---|---|---|---|---|---|---|---|
| | | | | Cylinder | | | | |
| Example | Cylinder diam. (mm) | L/D | Rotation of screw (rpm) | Rear portion | Mid portion | Front portion | Die head | Tip |
| 21-26 | 30 | 22 | 15-30 | 360 | 380 | 380 | 340 | 320 |

TABLE 7-continued

| | Extruder | | | Extrusion temperature (°C.) | | | | |
|---|---|---|---|---|---|---|---|---|
| | | | | Cylinder | | | | |
| Example | Cylinder diam. (mm) | L/D | Rotation of screw (rpm) | Rear portion | Mid portion | Front portion | Die head | Tip |
| 27 | 30 | 22 | 15–30 | 300 | 320 | 300 | 340 | 350 |

L stands for the length of screw, and D for the diameter of cylinder.

EXAMPLES 28–34

One part by weight of boron nitride (1 to 8 μm in particle size, product of Denki Kagaku Kogyo Co., Ltd., Japan) was added to 100 parts by weight of the fluorocarbon resin listed in Table 8, and the ingredients were uniformly mixed together by a V-type blender. The powdery mixture obtained was continuously extruded into a rod, 2 to 3 mm in diameter, by an extruder (cylinder diameter D: 25 mm, screw length L: 500 mm, L/D=20). At the same time, the rod was made into pellets, 3 to 4 mm in length, by a pelletizer.

With the pellets was admixed the polycarbonyl-oxy compound listed in Table 8. Subsequently, the mixture was extruded into a foamed rod, 5 mm in diameter, by an extruder having the dimensions listed in Table 9 under the conditions given in the same table. Table 8 shows the expansion ratio, foamed state and degree of coloration of the rod.

TABLE 8

| | | Polycarbonyl-oxy Compound | | Expansion | | |
|---|---|---|---|---|---|---|
| Example | Fluorocarbon resin | Kind | Amount (1) | ratio (2) (%) | Foamed state | Coloration of foamed resin |
| 28 | Copolymer of tetrafluoroethylene/ hexafluoropropylene (82/18, by wt.), M.I. = 6 g/10 min | Oxyalic acid ($H_2C_2O_4 \cdot 2H_2O$) | 0.5 | 50 | Uniform | None |
| 29 | Copolymer of tetrafluoroethylene/ hexafluoropropylene (82/18, by wt.), M.I. = 6 g/10 min | Oxyalic acid ($H_2C_2O_4 \cdot 2H_2O$) | 1.0 | 60 | Uniform | None |
| 30 | Copolymer of tetrafluoroethylene/ hexafluoropropylene (82/18, by wt.), M.I. = 6 g/10 min | Oxyalic acid ($H_2C_2O_4 \cdot 2H_2O$) | 5.0 | 60 | Uniform | None |
| 31 | Copolymer of tetrafluoroethylene/ hexafluoropropylene (82/18, by wt.), M.I. = 6 g/10 min | Citric acid | 0.5 | 50 | Uniform | None |
| 32 | Copolymer of tetrafluoroethylene/ hexafluoropropylene (82/18, by wt.), M.I. = 6 g/10 min | Citric acid | 1.0 | 60 | Uniform | None |
| 33 | Copolymer of tetrafluoroethylene/ perfluorobutyl vinyl ether (98/2, by wt.), M.I. = 10 g/10 min | Oxyalic acid ($H_2C_2O_4 \cdot 2H_2O$) | 1.0 | 60 | Uniform | None |
| 34 | Copolymer of tetrafluoroethylene/ ethylene (50/50, by wt.), M.I. = 15 g/10 min | Oxyalic acid ($H_2C_2O_4 \cdot 2H_2O$) | 1.0 | 60 | Uniform | None |

Note
(1) In parts by weight per 100 parts by weight of fluorocarbon resin.
(2) As defined above.

TABLE 9

| | Extruder | | | Extrusion temperature (°C.) | | | | |
|---|---|---|---|---|---|---|---|---|
| | | | | Cylinder | | | | |
| Example | Cylinder diam. (mm) | L/D | Rotation of screw (rpm) | Rear portion | Mid portion | Front portion | Die head | Tip |
| 28–33 | 30 | 22 | 15–30 | 360 | 380 | 380 | 340 | 320 |
| 34 | 30 | 22 | 15–30 | 300 | 320 | 300 | 340 | 350 |

L stands for the length of screw, and D for the diameter of cylinder.

EXAMPLES 35–38

An expanded rod, 5 mm in diameter, was prepared in the same manner as in Example 28 with the exception of using 1.0 part by weight of oxalic acid per 100 parts by weight of the fluorocarbon resin listed in Table 10. Table 10 also shows the expansion ratio, foamed state and coloration degree of the rod.

TABLE 10

| Ex. | Fluorocarbon resin*** | | Expansion ratio (%) | Foamed state | Coloration of rod |
|---|---|---|---|---|---|
| | Kind | Amount | | | |
| 35 | Thermoplastic (Daiel T-530, Product of Daikin Kogyo Co., Ltd., Japan) | 1.0 | 50 | Uniform | None |
| 36 | Thermoplastic (Daiel T-630, product of Daikin) | 1.0 | 50 | Uniform | None |
| 37 | Thermoplastic* | 1.0 | 50 | Uniform | None |
| 38 | Thermoplastic** | 1.0 | 50 | Uniform | None |

Note:
*Prepared by the process disclosed in Examined Japanese Patent Publication SHO 58-4728 and composed of 85 wt. % of rubber segment (vinylidene fluoride/hexafluoropropene = 79/21 in mole ratio) and 15 wt. % of hard segment (tetrafluoroethylene/ethylene /hexafluoropropene = 50/42/8 in mole ratio), M.I. 23 g/10 min.
**Copolymer of 85 wt. % of the above rubber segment and 15 wt. % of vinylidene fluoride, M.I. 2 g/10 min.
***After being foamed, thermoplastics used can be crosslinked by ionizing radiation.

We claim:
1. A process for producing a foamed article of a fluorocarbon resin having fine closed cells consisting essentially of expanding by heating and molding the fluorocarbon resin in a molten state admixed with particles of:
   (i) a depolymerizable polymer having a structural unit represented by the formula

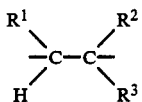
(1)

wherein $R^1$ is hydrogen or —$COOR^4$ group (wherein $R^4$ is hydrogen, a lower hydrocarbon group or fluorinated lower hydrocarbon group), $R^2$ is hydrogen, fluorine, a lower hydrocarbon group, fluorinated lower hydrocarbon group or —$COO4^4$ group (wherein $R^4$ is as defined above), and $R^3$ is $(CH_2)_k COOR^4$ group (wherein $R^4$ is as defined above, and k is 0 or 1) or

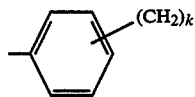

group (wherein k is as defined above), or
   (ii) a blowing agent of a polyether compound represented by the formula $$R^5(X^1O)_m R^6 \qquad (2)$$

wherein $R^5$ is hydrogen, halogen, hydroxyl group, a lower alkyl group or halogenated lower alkyl group, $X^1$ is a lower alkylene group of halogenated lower alkylene group, $R^6$ is hydrogen, a lower alkyl group, halogenated lower alkyl group, lower alkyloxy group or halogenated lower alkyloxy group, and m is an integer of from 2 to 30,000, or
   (iii) a blowing agent of a polycarbonyloxy compound having 2 to 20 carbon atoms.

2. A process as defined in claim 1 wherein the fluorocarbon resin contains at least 50 wt.% of fluorine and having a number average molecular weight of about 20,000 to 1,000,000 and a melt index of about 0.5 to about 50 g/10 min as measured according to ASTM D 1238-70.

3. A process as defined in claim 1 wherein the fluorocarbon resin is at least one of:
   (a) homopolymers of a monomer selected from the group consisting of tetrafluoroethylene, chlorotrifluoroethylene and 2,2-difluoroethylene,
   (b) copolymers of at least two of the above monomers, and
   (c) copolymers of at least one of the above monomers with a monomer selected from the group consisting of hexafluoropropene, perfluoroalkyl vinyl ether, oxy-containing perfluoroalkyl vinyl ether and ethylene.

4. A process as defined in claim 1 wherein the depolymerizable polymer having a structural unit (1) is a homo- or co-polymer having a number average molecular weight of about 10,000 to about 5,000,000 and is polymer of ethylenically unsaturated monomer(s) which is depolymerizable and vaporizable at a temperature about 150° C. lower than the melting point of the fluorocarbon resin to the decomposition temperature the resin.

5. A process as defined in claim 1 wherein the depolymerizable polymer having a structural unit of the formula (1) is a compound wherein the substituent $R^1$ is H, $R^2$ is —F or —$CH_3$, and $R^3$ is —COORf wherein Rf is H or a fluorinated lower aliphatic group.

6. A process as defined in claim 1 wherein the polyether compound represented by the formula (2) has a number average molecular weight of about 300 to about 1,000,000.

7. A process as defined in claim 6 wherein the polyether compound of the formula (2) has a number average molecular weight of about 1,000 to about 50,000 and contains at least two ether groups.

8. A process as defined in claim 1 wherein the polyether compound is a compound represent by $$R^7(CY^1{}_2 CY^2{}_2 CY^3{}_2 O)_n C^4{}_2 R^8$$

wherein $Y^1$ to $Y^4$ are the same or different and are each hydrogen, halogen, a lower alkyl group or halogenated lower alkyl group, $R^7$ and $R^8$ are the same or different and are each hydrogen, halogen, hydroxyl group, a lower alkyl group, halogenated lower alkyl group, lower alkyl-oxy group, halogenated lower alkyl-oxy group, —$OX^1R^9$ group (wherein $X^1$ is as defined above, $R^9$ is a lower alkyl-oxy group or halogenated lower alkyl-oxy group), —$CY^1{}_2COOH$ group (wherein $Y^1$ is as defined above) or —CY$^1_2$COZ group (wherein Y$^1$ is as defined above, and Z is a halogen), and n is 1 to 10,000.

9. A process as defined in claim 1 wherein the polycarbonyloxy compound is at least one of aliphatic, alicyclic and aromatic carboxylic acids having at least two carbonyloxy groups in the molecule and salts thereof.

10. A process as defined in claim 9 wherein the carboxylic acids are oxalic acid, itaconic acid, citraconic acid, acetonedicarboxylic acid, maleic acid, succinic acid, glutaric acid, phthalic acid, adipic acid, citric acid and aconitic acid.

11. A process as defined in claim 9 wherein the salts of carboxylic acids are ammonium salts, sodium salts, potassium salts, magnesium salts, calcium salts and copper salts.

12. A process as defined in claim 1 wherein the blowing agent is used in an amount of about 0.01 to about 50 parts by weight per 100 parts by weight of the fluorocarbon resin.

13. A process as defined in claim 12 wherein the blowing agent is used in an amount of about 0.05 to about 10 parts by weight per 100 parts by weight of the flourocarbon resin.

14. A process as defined in claim 1 wherein a heat-resistant nucleating agent in the form of fine particles up to 50 μm in size is used in an amount of about 0.01 to about 10 parts by weight per 100 parts by weight of the fluorocarbon resin.

15. A process as defined in claim 14 wherein about 0.5 to about 5 parts by weight of the nucleating agent is used per 100 parts by weight of the fluorocarbon resin.

16. A process as defined in claim 1 wherein about 0.005 to about 5 parts by weight of a catalyst for decomposing the blowing agent is used per 100 parts by weight of the fluorocarbon resin.

17. A process as defined in claim 1, wherein the fluorocarbon resin is admixed with the blowing agent of the polyether compound or the blowing agent of the polycarbonyloxy compound.

* * * * *